C. R & J. O. Taber.
Mower.

№ 79518 Patented Jun. 30, 1868.

Witnesses
J. H. Burridge
C. E. Waite

Inventors
C. R. & J. O. Taber

C. R. & J. O. Taber.
Mower.
N° 79518. Patented Jun. 30, 1868
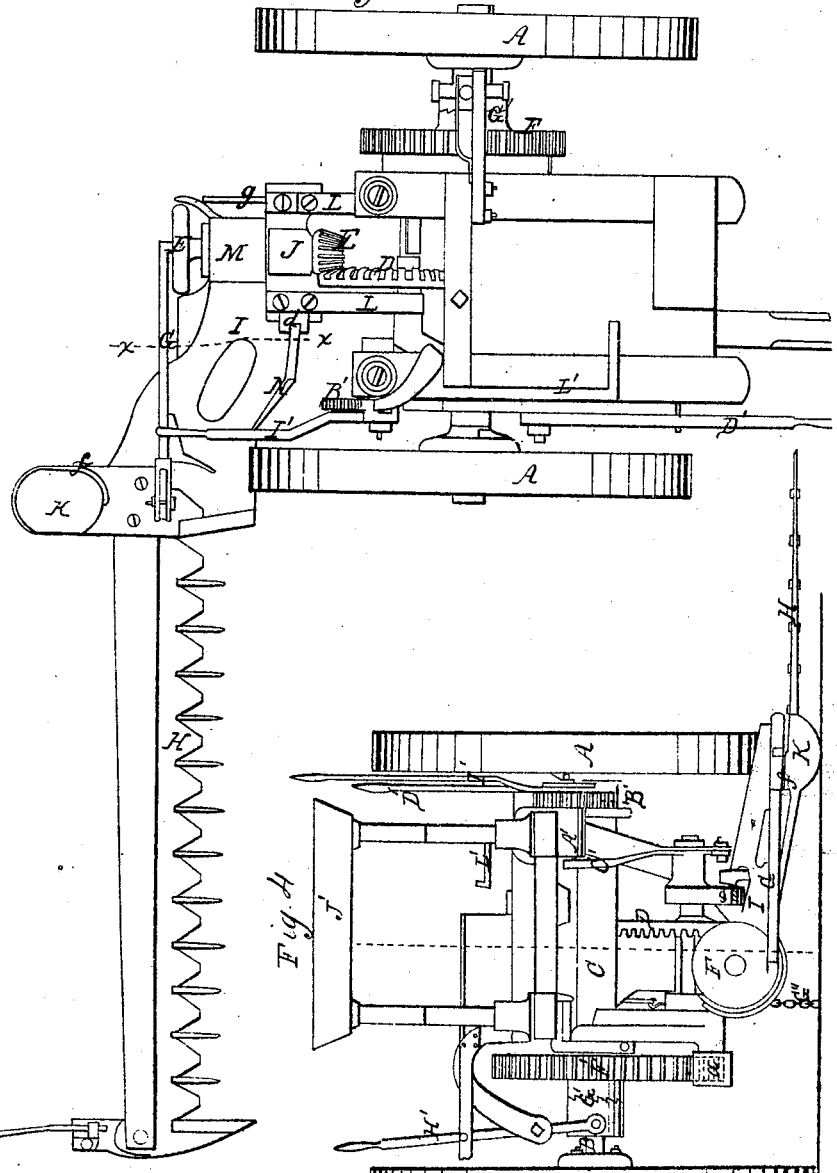
Witnesses
Inventors

United States Patent Office.

C. R. TABER AND J. OSCAR TABER, OF SALEM, OHIO.

Letters Patent No. 79,518, dated June 30, 1868.

---

IMPROVEMENT IN HARVESTERS.

---

*The Schedule referred to in these Letters Patent and making part of the same.*

---

TO ALL WHOM IT MAY CONCERN:

Be it known that we, C. R. TABER and J. OSCAR TABER, of Salem, in the county of Columbiana, and State of Ohio, have invented certain new and useful Improvements in a Combined Harvester and Mower; and we do hereby declare that the following is a full and complete description of the construction and operation of the same, reference being had to the accompanying drawings, making a part of this specification, in which—

Figure 2:
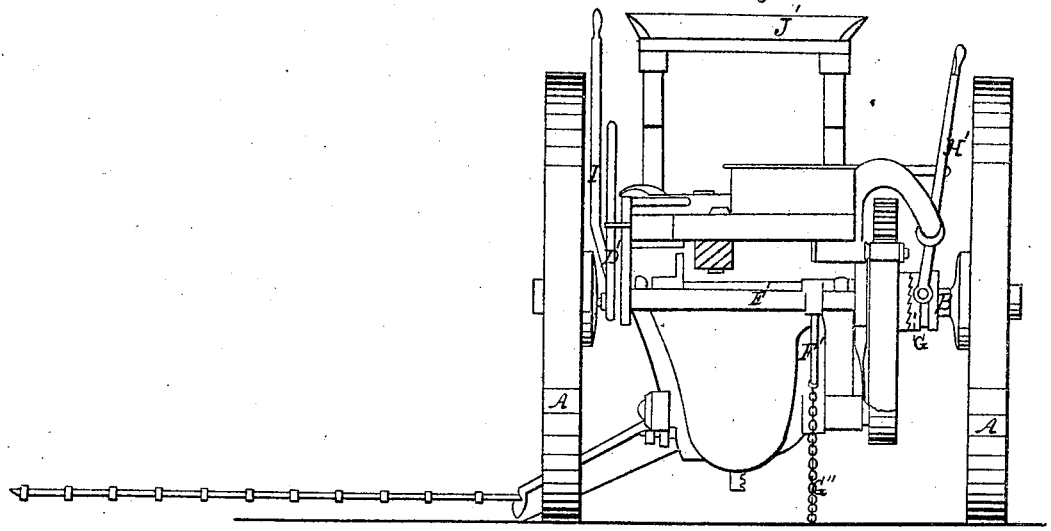
Figure 1:
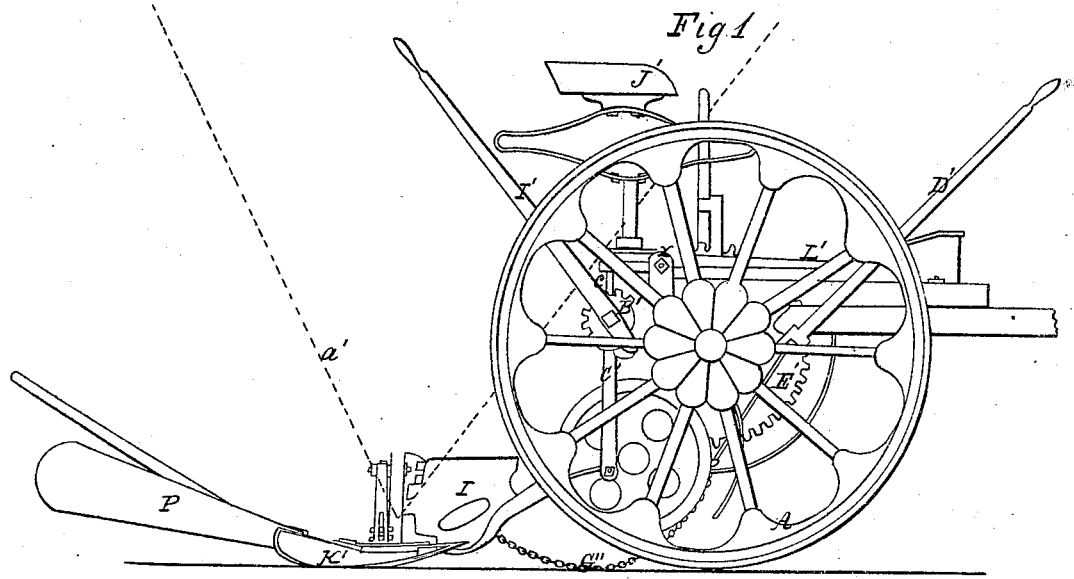

Figure 1 is a side view of the machine.
Figure 2 is a view of the front.
Figure 3 is a view of the top.
Figure 4 is a view of the rear end.
Like letters of reference refer to like parts in the several views.

In fig. 2, A represents the driving-wheels of the harvester, on which is arranged the following machinery:

To the axle, B, fig. 4, is hinged a frame, C, in which is shafted a bevelled wheel, D, made to engage with a bevelled pinion, E, by which the crank F operates the pitman G and knives H. I, the drag-bar or plate, is attached to the frame C by the intervention of the stay J. This stay is connected to the frame C by links, L, said links being so attached to the frame as to allow to them a vertical movement. The drag-plate is also hinged to the stay by a sleeve-joint, M, surrounding the shaft to which the pinion E is keyed, thereby allowing to the plate a vertical movement, for the purpose of adjusting it and the cutter-bar to the unevenness of the ground, and avoiding obstructions, as will hereafter be shown.

F' is a cog-wheel, fitted to the shaft B, and made to engage with a small pinion, indicated by the dotted line $a$, fig. 4, said pinion being keyed to the shaft, on which the bevelled wheel D is mounted in the frame C.

G', fig. 2, is a clutch, whereby the wheel F' is thrown into gear with the driving-wheel A, and H' the lever by which said clutch is operated.

I', fig. 3, is a lever, connected to a short shaft journalled in a sleeve, A', on said shaft, and close to the lever is keyed a ratchet-wheel, B', and to the opposite end is a jointed arm, C', which is attached to the outer end of the frame C, by means of which the said frame and its appendages are elevated from the ground, as and for a purpose hereafter shown.

D', fig. 2, is a lever, keyed to one end of the shaft E'. To this shaft is also keyed an arm, F'', to the extreme end of which is attached a chain, G''. The opposite end of said chain in turn is attached to an arm, $g$, projecting from the stay J, whereby the said stay and its several attachments are depressed, for a purpose hereafter shown.

Having thus described the construction and arrangement of the machine, the operation of the same is as follows:

The driver takes his place upon the seat J'. The drag-plate and cutter-bar are then dropped upon the ground, as shown in fig. 2, the end of the plate resting upon the shoe K, fig. 4, and the outer end of the cutter-bar upon the shoe K'. This position and elevation of the cutter-bar is about proper for cutting ordinary grass. A greater elevation may be given to the drag-plate and bar, for cutting grain, &c., by means of the lever and ratchet-wheel I' B'. Thus the operator, with his foot, depresses the end of the lever L', said lever being pivoted to the top of the machine, at the point $x$, fig. 1; the effect of which will be to raise the short arm of the lever, thereby disengaging a lug, c', fig. 1, from the ratchet. The lever I' is then pushed forward by the hand of the operator, which will draw upward the jointed arm C', and with it the outward end of the frame C, together with the stay J and drag-plate I, which, as a consequence, will elevate the cutter-bar, or rather throw upward its front edge, throwing the weight of the bar more or less upon the heels of the shoes, according to the degree of elevation.

The elevation thus obtained is secured by the lug c', which is allowed to drop again into the ratchet, as before.

It will be observed, that in thus elevating the cutter-bar, no change is made in its horizontal position.

In order to avoid obstructions that may be in the way of the cutter-bar, and pass over or by them without stopping, the outer end of the bar can be elevated by means of the lever and chain above referred to. Thus the operator draws the lever D′ towards him, thereby throwing upward the arm F″, projecting from the shaft E′, to which the lever is connected. This throwing up of the arm draws on the chain, which will bring down the stay J, it being hinged, as above said, to the frame C. By thus depressing the stay, the attached end of the drag-plate is carried down with it at the same time the outer end of the cutter-bar is elevated, it being connected to the plate in a rigid manner, the heel of the shoe K serving for a fulcrum, on which the geared end of the drag-plate and the outer end of the cutter-bar turn while elevating the bar for the purpose above said.

In order to give additional strength to the connection of the drag-plate to the stay J, the plate is expanded in the direction of the line $x\ x$. The inner edge of the plate is turned upward, forming a flange, N, the inner end of which is made slightly to project, and is embraced by a guide-stay, $d$, fig. 3, in which the projecting end slides, when the cutter-bar is elevated for passing obstructions. As the bar is drawn forward, much of the strain of the draught will be sustained by the projecting flange and stay, thereby relieving the sleeve-joint M of excessive strain.

It will be observed that one side of the heel of the shoe K is made somewhat higher than is the other, as seen at $f$, fig. 4, the purpose of which is that, when the cutter-bar is thrown upward to a vertical position, the shoe will have a sufficient bearing-surface on the ground to slide along without cutting into the earth. Hence, when the bar is turned up to the position indicated by the line $a'$, fig. 1, which, as will be seen, is directly in the rear of the machine, it can be drawn along upon the ground without cutting into the turf and tearing the grass.

In this position of the cutter-bar and drag-plate the machine can be run close to a stump or through a gateway without interfering or striking, and, by removing the seat, the bar can be laid upon the top of the machine, in which condition the harvester may be removed from place to place with ease and convenience.

The dividing or swath-board, P, fig. 1, is made of plate steel, whereby an elastic character is given to it, so that, on striking against any obstructions, it will yield, and not break, as one made of wood in the ordinary way is liable to do.

What we claim as our improvement, and desire to secure by Letters Patent, is—

1. The arrangement of the lever D′, shaft E′, and arm F″, in combination with the stay J and drag-plate I, for the purpose set forth.

2. The lever I′, check-lever L′, and jointed arm C′, all constructed and arranged to operate as and for the purpose specified.

C. R. TABER,
J. OSCAR TABER.

Witnesses:
W. H. BURRIDGE,
J. HOLMES.